Sept. 8, 1925.
L. C. VANDERLIP
1,552,586
STEERING WHEEL LOCK
Filed Feb. 12, 1920
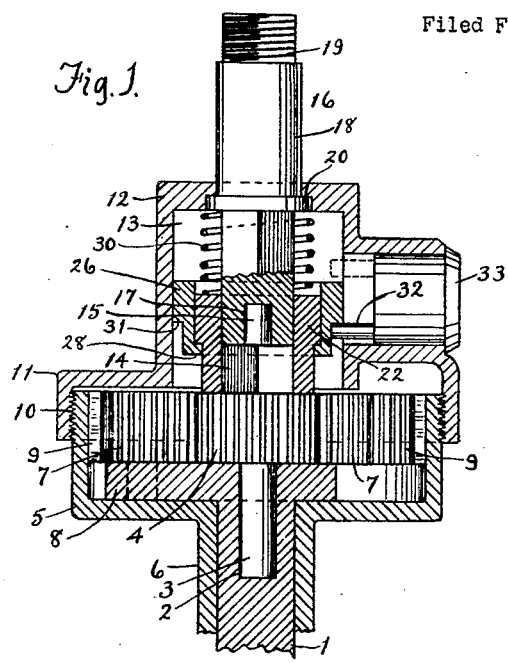
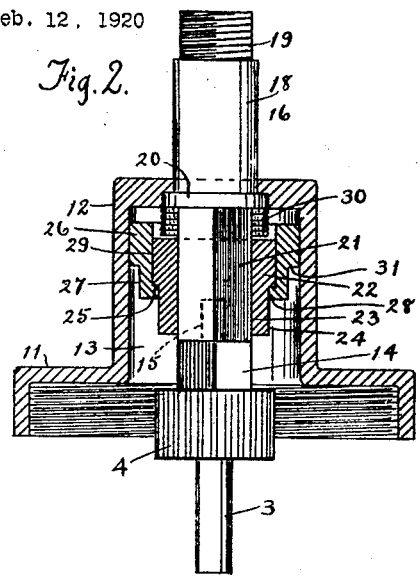
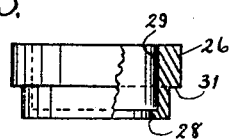
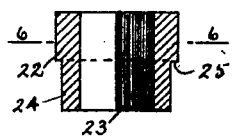
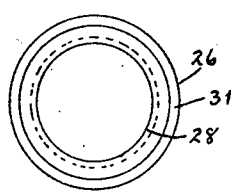
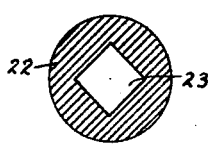
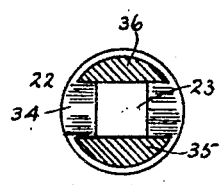
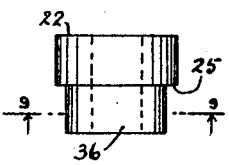
INVENTOR.
Louis C. Vanderlip.

Patented Sept. 8, 1925.

1,552,586

UNITED STATES PATENT OFFICE.

LOUIS C. VANDERLIP, OF ELKHART, INDIANA.

STEERING-WHEEL LOCK.

Application filed February 12, 1920. Serial No. 358,309.

*To all whom it may concern:*

Be it known that I, LOUIS C. VANDERLIP, a citizen of the United States, residing in the city of Elkhart, county of Elkhart, Indiana, have invented certain new and useful Improvements in Steering-Wheel Locks, of which the following is a specification.

This invention relates to locking devices to prevent theft or unauthorized operation of automobiles, and especially to means for locking the steering wheel thereof in either operative or inoperative position.

An object of my invention is the production of a steering wheel locking device which is applicable to motor cars of the Ford type in which planetary gearing is used in the steering head.

Another object is the production of a device of the character described in which the center or driving pinion of the planetary gear remains in constant mesh therewith and in which a movable clutch is resorted to for operatively connecting or disconnecting the steering wheel and steering gear.

A third object is the production of a steering wheel locking device which is readily applicable to cars now in use. Still another object of the invention is the production of a device of the character described in which there is a shiftable clutch used to connect or disconnect the steering wheel with the driving pinion of the planetary gearing of the steering head in which the driving pinion itself remains in constant mesh with the planetary gearing and in which the steering wheel itself is without endwise movement. Other objects of my invention are mentioned and described herein.

The preferred embodiment of my invention is illustrated in the accompanying drawing in which Figure 1 is a vertical sectional view of the invention with the clutch members operatively engaged with the driving pinion of the planetary gearing; Fig. 2 is a view at right angles and in section showing the clutch members disconnected and the driving pinion of the planetary gearing rendered inoperative; Fig. 3 is a side view of the clutch lifter ring; Fig. 4 is a bottom plan view of the clutch lifter ring; Fig. 5 is a view in elevation through the movable clutch member, in section; Fig. 6 is a section taken on the line 6—6 of Fig. 5; Fig. 7 is a view in elevation of the exterior of a modified form of the movable clutch member; Fig. 8 is a bottom plan view of the member shown in Fig. 7; and Fig. 9 is a section taken on the line 9—9 of Fig. 7.

Similar numerals of reference indicate like members throughout the several views on the drawing.

Referring to the drawing in detail, the numeral 1 indicates the top end of a steering post of a motor car of the Ford type in which a cylindrical bore 2 is formed axially thereof, said bore being engaged by the pinion shaft 3 which carries the drive pinion 4 rigid therewith.

The numeral 5 indicates the usual cylindrical housing or lower casing carried upon the top end of the cylindrical column 6 and within which the usual planetary gears 7, 7 are mounted upon the steering post head 8 in the usual manner, which is well known in the art, said gears meshing with the annular rack 9 formed on the inner periphery of the casing 5, and meshing also with the drive pinion 4 which is disposed centrally of said gears. The outer periphery of the housing 5 is screw threaded at 10 to carry the threaded cap or top casing member 11 which is provided with the hollow extension portion 12 within which extension is a cylindrical chamber 13 adapted to carry the movable clutch member to be hereinafter described.

The numeral 14 indicates a stub pinion driver shaft rigidly connected with the pinion 4 on the top side thereof, which shaft may be polygonally formed to serve as a clutch member and from which a stud shaft 15 projects into telescopic relation with the revoluble steering wheel shaft 16 which may be cylindrically bored at 17 to receive said stud shaft which is adapted to maintain the axial relation between the stub shaft 14 and the wheel shaft 16.

The wheel shaft 16 may have the cylindrical portion 18 adapted to carry a steering wheel and a screw threaded portion 19 adapted to carry a nut to hold the wheel on the shaft section 18. The shaft 16 may be provided with the annular flange 20 engaging within and upon the upper wall of the chamber 13 to prevent upward lengthwise movement of said shaft, the lower end of said shaft revolubly engaging the upper face of the clutch member 14 to prevent downward lengthwise movement of said shaft and demeshing of the pinion 4 from gears 7.

The numeral 21 indicates a polygonal section of the shaft 16 arranged within the cap chamber 13 and adapted to cooperate with the clutch element 14 on gear 4, said shaft section being adapted also to carry the sleeve clutch, or coupler, element 22, the latter being provided with a polygonal bore 23 to effect a splining connection between said coupler and shaft section. The exterior of the clutch member 22 may be cylindrical in formation and may have a cylindrical reduced portion or lower end 24 to form an annular shoulder 25, the lower end of the clutch bore 23 being adapted to engage about the polygonal clutch member 14 for driving the pinion 4. Numeral 26 indicates a hollow cylindrical clutch lifter member or ring which is slidably mounted within the bore of the chamber 13, said lifter member having a cylindrical reduced portion 27 which is provided with the annular inwardly projecting flange 28 adapted to engage beneath the annular shoulder 25 of the clutch 22, the latter being arranged within the bore 29 of said lifter member with slight clearance to enable the lifter ring to rotate thereon.

Numeral 30 indicates a coil spring which may encompass the shaft section 21 and bear against the upper end of the slidable clutch 22 for normally maintaining the engagement between the clutch members 22 and 14 and to prevent inadvertent disengagement thereof. Numeral 31 indicates an annular shoulder which may be formed exteriorly of and on the outer periphery of the lifter ring 26 and beneath which a cam or lifter pin 32 engages, said pin being mounted in the lock 33. The lock 33 is mounted in the casing 12 and is provided with the usual revoluble cylinder controlled by a key, neither of which is shown, upon the end of which cylinder the pin 32 is mounted and which may be swung thereby through an arc of approximately one hundred eighty degrees from a bottom to a top position, the latter position being indicated by the dotted lines of said pin.

When the clutches 14 and 22 are engaged, as shown in Fig. 1 of the drawing, the latter may be disengaged from the former by upwardly sliding it on the wheel shaft section 21 to the position shown in Fig. 2, which disengagement may be effected by inserting the key in the lock 33 and rotating the lifter pin 32 to the upper or dotted line position thereof. During this operation the lifter ring will rotate partially around the clutch member 22 to compensate for the semicircular movement of the pin 32. Thereupon, the key may be withdrawn from the lock 33 leaving the clutch 22 locked in disengagement with clutch member 14 from which position it can be released only by a person having a key to the lock 33.

Figures 7, 8 and 9 show a modified form of the movable clutch member 22, the lower end whereof is transversely channeled at 34 to form the oppositely disposed jaws 35 and 36 disposed upon opposite sides of the polygonal bore 23 and which are adapted to engage upon opposite sides of the clutch member 14.

I claim:

1. In a steering device for vehicles, the combination of a steering post, a clutch in constant actuating relation with said post, a steering wheel shaft, a second clutch in constant actuating relation with said shaft, said second clutch member having a sliding connection with said shaft, and means for shifting the second clutch member from engagement with the first clutch, said means including a cylindrical lifter ring sleeving said clutch, and a lock adapted to actuate said lifter ring and thereby said movable clutch.

2. In a steering device for vehicles, the combination of a steering post; a clutch in constant actuating relation with said post; a steering wheel shaft; a second clutch in constant actuating relation with said shaft, said second clutch member having a sliding connection with said shaft and spring actuated; and means for shifting the second clutch out of engagement with the first clutch, said means including a lifter ring encompassing said clutch and a lock adapted to actuate said lifter ring and thereby said sliding clutch.

3. In a steering device for vehicles, a steering wheel shaft; a steering post; driven gears for actuating the steering post; a stationary housing for said driven gears; a drive gear in constant mesh with the driven gears; coupling means carried by said drive gear; spring pressed movable coupling means mounted to move longitudinally with respect to the axis of said post, said coupling means being adapted to alternately couple and uncouple said wheel shaft and drive gear, whereby, when said shaft and gear are coupled, rotation of said wheel shaft will effect rotation of said steering post, and whereby, when said shaft and gear are uncoupled, rotation of said wheel shaft will not effect rotation of said steering post; and means for actuating said clutch, said means including locking means mounted in said housing.

4. In a steering device for vehicles, a casing provided with a separate piece cap, a steering wheel mount rotatably arranged in said casing, a steering post, driven gears in said casing for actuating the steering post, a drive gear in constant mesh with the driven gears, movable coupling means mounted to move longitudinally with respect to the axis of said post, said coupling means being adapted to alternately couple and uncouple said wheel mount and drive gear, whereby when said wheel mount and drive gear are coupled together rotation of said wheel mount will effect rotation of said steering post, and whereby when said wheel mount and drive gear are uncoupled rotation of said wheel mount will not effect rotation of said steering post, and key controlled lock means mounted in said casing cap for actuating said coupling means.

5. In a steering device for vehicles, a casing provided with a removable cap, a steering wheel mount rotatably arranged in said casing, a steering post, driven gears in said casing for actuating the steering post, a drive gear in constant mesh with the driven gears, movable coupling means mounted to move longitudinally with respect to the axis of said post, said coupling means being adapted to alternately couple and uncouple said wheel mount and drive gear, whereby when said wheel mount and drive gear are coupled together rotation of said wheel mount will effect rotation of said steering post, and whereby when said wheel mount and drive gear are uncoupled rotation of said wheel mount will not effect rotation of said steering post, and a key controlled lock mounted in said casing cap for actuating said coupling means.

6. In a steering device for vehicles, a casing provided with a separate piece cap, a steering wheel mount rotatably arranged in said casing, a steering post, driven gears in said casing for actuating the steering post, a drive gear in constant mesh with the driven gears, spring pressed movable coupling means mounted to move longitudinally with respect to the axis of said post, said coupling means being adapted to alternately couple and uncouple said wheel mount and drive gear, whereby when said wheel mount and drive gear are coupled together rotation of said wheel mount will effect rotation of said steering post, and whereby when said wheel mount and drive gear are uncoupled rotation of said wheel mount will not effect rotation of said steering post, and key controlled lock means mounted in said casing cap for actuating said coupling means.

7. In a steering device for vehicles, a casing provided with a separate piece cap, a steering wheel mount rotatably arranged in said casing, a steering post, driven gears in said casing for actuating the steering post, a drive gear in constant mesh with the driven gears, said gear being provided with projecting coupling means, movable coupling means mounted to move longitudinally with respect to the axis of said post, said movable coupling means being adapted for alternate engagement and disengagement with said drive gear coupling means for alternately coupling and uncoupling said wheel mount and drive gear, and key controlled lock means mounted in said casing cap for actuating said movable coupling means.

8. In a steering device for vehicles, a casing provided with a separate piece cap, a steering wheel mount rotatably arranged in said casing, a steering post, driven gears in said casing for actuating said steering post, a drive gear in constant mesh with the driven gears, said gear being provided with projecting coupling means, movable coupling means mounted to move longitudinally with respect to the axis of said post, said movable coupling means being adapted for alternate engagement and disengagement with said drive gear coupling means for alternately coupling and uncoupling said wheel mount and drive gear, said movable coupling means engaging said drive gear coupling means when the former is in the depressed position, and a key controlled lock mounted in said casing cap for actuating said movable coupling means.

9. In a steering device for vehicles, a casing provided with a removable cap, a steering wheel mount rotatably arranged in said casing, a steering post, driven gears in said casing for actuating the steering post, a drive gear in constant mesh with the driven gears, said drive gear being provided with a projecting coupler element rigid with said gear, a movable coupler element encompassing a portion of said wheel mount and rotative therewith and mounted to move longitudinally with respect to the axis of said post, said movable coupler element being adapted for alternate engagement and disengagement with said drive gear coupler element for alternately coupling and uncoupling said wheel mount and drive gear, said movable coupler element engaging said drive gear coupler element when the former is in the depressed position, and a key controlled lock mounted in said casing cap for disengaging said movable coupler element from the drive gear coupler element.

10. In a steering device for vehicles, a casing, a steering wheel mount rotatably arranged in said casing, a steering post, driven gears in said casing for actuating the steering post, a drive gear in constant mesh with the driven gears, a stub-shaft carried by said drive gear, and a lock controlled and actuated coupler element mounted to move longitudinally with respect to the axis of said steering post, said coupler element being adapted to alternately couple and uncouple said wheel mount and stub-shaft, whereby when said wheel mount and stub-shaft are coupled together rotation of said wheel mount will effect rotation of said steering post, and whereby when said wheel mount and stub-shaft are uncoupled rotation of said wheel mount will not effect rotation of said steering post.

11. In a steering device for vehicles, a casing, a steering wheel mount rotatably arranged in said casing, a steering post, driven gears in said casing for actuating said steering post, a drive gear in constant mesh with the driven gears, a stub-shaft carried by said drive gear, and a spring pressed lock actuated coupler element within the casing and mounted to move longitudinally with respect to the axis of said steering post, said coupler element being adapted to alternately couple and uncouple said wheel mount and stub-shaft, whereby when said wheel mount and stub-shaft are coupled together rotation of said wheel mount will effect rotation of said steering post, and whereby when said wheel mount and stub-shaft are uncoupled rotation of said wheel mount will not effect rotation of said steering post.

12. In a steering device for vehicles, a casing, an apertured cap for said casing, a steering wheel shaft rotatably arranged in said casing and projecting to the exterior thereof through said cap aperture, the portion of said shaft disposed exteriorly of said casing being adapted to receive the bore of a steering wheel hub, a steering post, driven gears in said casing for actuating said steering post, a drive gear in constant mesh with said driven gears, movable coupling means mounted to move longitudinally with respect to the axis of said post, said coupling means being adapted to alternately couple and uncouple said wheel shaft and drive gear, whereby, when said wheel shaft and drive gear are coupled together, rotation of said wheel shaft will effect rotation of said steering post, and whereby, when said wheel shaft and drive gear are uncoupled, rotation of said wheel shaft will not effect rotation of said steering post, and key controlled lock means mounted in said casing cap for actuating said coupling means.

13. In a steering device for vehicles, a casing, an apertured cap for said casing, a steering wheel shaft rotatably arranged in said casing, said shaft projecting through said cap aperture to the exterior of said casing, said projecting shaft portion being adapted to carry a separate part steering element, a steering post, driven gears within said casing for steering post actuation, a drive gear in constant mesh with said driven gears, flanged coupling means movably mounted within said casing and adapted to move longitudinally with respect to the axis of said steering post, said coupling means being adapted to alternately couple and uncouple said wheel shaft and drive gear, whereby, when said wheel shaft and drive gear are coupled together, rotation of said wheel shaft will effect rotation of said steering post, and whereby, when said wheel shaft and drive gear are uncoupled, rotation of said wheel shaft will not effect rotation of said steering post, and key actuated lock means engaging beneath said coupling means flange for actuating said coupling means.

14. In a steering device for vehicles, a casing, an apertured cap for said casing, a steering wheel shaft rotatably arranged in said casing, said shaft projecting through said cap aperture to the exterior of said casing and adapted to carry a detachable steering element, a steering post, driven gears within said casing for actuating the steering post, a drive gear in constant mesh with said driven gears, flanged coupling means mounted within said casing to move longitudinally with respect to the axis of said steering post, said coupling means being adapted to alternately couple and uncouple said wheel shaft and drive gear, whereby, when said wheel shaft and drive gear are coupled together, rotation of said wheel shaft will effect rotation of said steering post, and whereby, when said wheel shaft and drive gear are uncoupled, rotation of said wheel shaft will not effect rotation of said steering post, and key controlled lock means mounted in said casing cap and engaging said coupling means flange for actuating said coupling means.

15. In an automobile steering gear lock, the combination with steering gear including a rotary steering post, a planetary gear housing mounted relatively thereto, and planetary driven gears mounted in said housing for steering post actuation, of a drive gear in constant mesh with said driven gears; a steering wheel mount rotatable in said housing, disjoined from said drive gear and fixed against axial movement; movable coupling means mounted within said housing and adapted to move longitudinally with respect to the axis of said wheel mount, said coupling means being adapted also to alternately couple and uncouple said wheel mount and drive gear and a key controlled lock mounted in said housing for actuating said coupling means.

In testimony whereof I have hereunto affixed my signature this 10th day of February, 1920.

LOUIS C. VANDERLIP.